June 9, 1931.   A. G. GLASGOW   1,809,333
WATER GAS GENERATOR
Filed Feb. 18, 1925   2 Sheets-Sheet 1

WITNESS:

INVENTOR
Arthur G. Glasgow
BY
Augustus B. Stoughton,
ATTORNEY.

June 9, 1931.  A. G. GLASGOW  1,809,333
WATER GAS GENERATOR
Filed Feb. 18, 1925    2 Sheets-Sheet 2

WITNESS:

INVENTOR
Arthur G. Glasgow
BY
Augustus B. Stoughton.
ATTORNEY.

Patented June 9, 1931

1,809,333

UNITED STATES PATENT OFFICE

ARTHUR G. GLASGOW, OF LONDON, ENGLAND, ASSIGNOR TO THE U. G. I. CONTRACTING COMPANY, OF PHILADELPHIA, PENNSYLVANIA, A CORPORATION OF DELAWARE

WATER GAS GENERATOR

Application filed February 18, 1925. Serial No. 9,926, and in Great Britain June 18, 1924.

This invention relates to self-clinkering water gas generators.

It has long been proposed in connection with gas generators and more particularly in connection with gas producers furnished with mechanical grates, to facilitate the removal of clinker by substituting a water-cooled jacket for the critical portion of the usual firebrick lining containing the fuel bed; but, because of the inefficiency and ineffectiveness of this method, it has been abandoned in connection with water gas generators, and, in gas producers, an annular steam boiler surrounding the whole of the fuel-bed, and utilized for the usual plant steam supply, is now suggested as a substitute for the unsatisfactory water jacket.

Such an arrangement requires a design of boiler badly adapted to withstand the usual working steam pressures, and, in addition to the hazards and costs involved, there are grave constructional, transport, and other difficulties when applied to large-sized producers. In so far as proposals have been made to construct gas producers equipped with boilers for atmospheric or low pressure steam the difficulty arises as to the utilization of atmospheric steam, or of the surplus low pressure steam above that required for the service of the producer. Moreover, a boiler or steam generator of such design applied to carburetted water gas manufacture has the fundamental defect that the temperature of the top of the fuel bed is reduced below the ready ignition point of secondary combustion approximately 950° F. to 1,100° F., and therefore the air blowing period must be wastefully prolonged in order to secure the proper regulation of temperature in the oil-gasifying chambers.

The object of this present invention is to provide a safe and efficient self-clinkering and self-steaming water gas generator wherein there is no manual labor for barring down or clinkering, nor any loss of cooling water or of heat therein, while the means of automatically attaining these ends simultaneously provide the generator with low pressure steam suitable for the generation of the water gas but not in excess of the requirements of the generator.

To this end, I have by convincing trials determined, in the first place, how a deep fuel bed confined within an annular metal vessel utilized as a steam boiler can be adapted to the production of water gas so that the clinker neither adheres to the wall of the generator nor arches over the grate, but travels evenly to the bottom of the fuel bed, thus providing uniformly efficient condition of the fuel bed while eliminating barring down of the fire from above; secondly, I have by further trials demonstrated how all of the clinker and ash, instead of accumulating at the bottom of the fuel bed, can be automatically and continuously discharged with low carbon content as they reach the bottom, thus constantly maintaining the fuel bed in the condition of high gas-making efficiency while eliminating clinkering and clearing labor and clinkering doors and tools, as well as interruption of gasmaking; and thirdly, I have discovered and corroborated by continued experiment how a water gas generator and a safe lowpressure steam generator can be combined so that the steam space is never in contact with the fuel bed or blast or water gases, the production of steam does not exceed that needed for the generator (thus permitting the economic use of very low pressures,) and the temperature of the top of the fuel bed is not reduced below that necessary for ready ignition of the issuing blast gases, all without any interference whatever with the efficiency of the automatic self-clinkering operations. According to the present invention, in order to provide a self-clinkering and substantially self-steaming water gas generator, there is embodied in the generator a steam boiler comprising an annular water vessel surrounding a portion of the fuel-bed, the location area and surface of its inner wall being adapted to the methods of air blasting and steaming and to the character of the fuel, so that the clinker and ashes can be continuously discharged from the generator by mechanical means while extracting not more heat from the generator than is needed to produce the steam required by the generator or as will reduce the temperature of the issuing blast gases below that required for ready ignition for utilization. The said inner wall of the annular water vessel is sufficiently high to prevent adhesion of clinker to the wall, but so restricted in height that the absorption of heat from the generator does not exceed that needed for the production of the steam required by the generator. The boiler, of which this water vessel forms the heated water space is provided with means for collecting the steam produced and conducting it to the generator in the required quantity and preferably at a low pressure, and the generator is provided with a mechanically actuated grate which removes the clinker which it is able to do as the water vessel by preventing adhesion of clinker to the generator wall ensures the clinker and ash regularly passing to and being removed by the grate.

The present invention also includes certain provisions hereinafter referred to for rendering a generator embodying such a boiler and a mechanically actuated grate more effectively and easily operated.

In the accompanying drawings,

Figs. 3 and 4 are diagrammatic elevational views hereinafter referred to.

Figure 1:
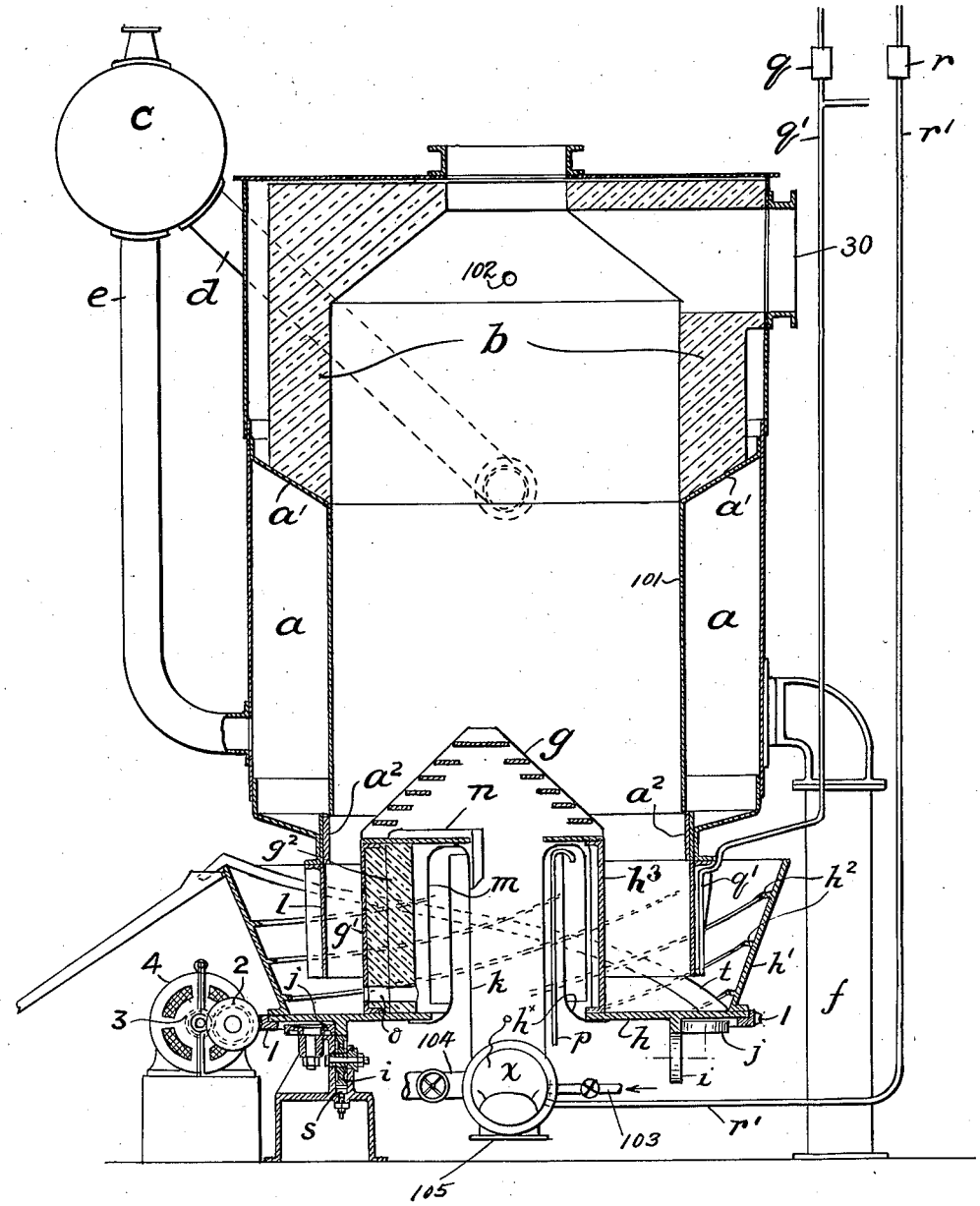
Fig. 1 shows in central vertical section a self-clinkering and substantially self-steaming water gas generator according to the invention.

Referring to Fig. 1, the annular vessel $a$ which surrounds the fuel bed and provides all of the heating surface for steam generation, reaches in height just above the zone of clinker-forming combustion, and is surmounted by a generator wall of fire-brick $b$. It thus becomes the equivalent of the heated water space or leg of a steam boiler which is provided with arrangements for water circulation and steam evolution and storage such as the following: A suitable reservoir $c$ is provided at a higher level than the heated water-leg for the proper collection, separation and storage of steam and circulating water, and this reservoir is connected by one or more conduits $d$ with the upper part of the annular vessel $a$ in such manner that the steam evolved escapes into the steam reservoir without hurtfully exposing the face or top of the annular water vessel to overheating, which is accomplished by upwardly and outwardly inclining the top wall $a^1$ of the annular vessel at such an angle to the horizontal that the outside of the annular water vessel is sufficiently higher than its inside to enable the said connections to be made and to operate without displacing the water content from sufficient contact with the inside and top plates of the heated annulus to prevent over-heating of the metal. Adequate circulation of the steaming water is secured by one or more connections $e$ between the lower part of the steam and water reservoir and the lower part of the annular water vessel $a$. All of these connections are preferably utilized to sustain the reservoir without any other support.

The above described annular boiler is carried by legs (of which one is shown at $f$) columns, framework or other supports resting on the ground or other foundation, and within the circle of these supports the grate structure, comprising an upper portion $g$ and circular bottom $h$, rotates about a vertical axis upon and guided by rollers $i$ and $j$, slides, or the like, and carries the weight of the fuel bed, quite independently of the boiler supports. The upper portion of the grate containing the air passages is approximately conical in form, and covers a cylinder placed eccentrically as regards the annular boiler and a central conduit $k$ which serves to conduct the air blast or steam to the grate and to carry away the down run water gas. The up run water gas is led off through opening 30 in the fire-brick wall $b$. The eccentric rotation of the upper portion $g$ and its supporting cylinder crushes and expels the clinker and ash. For the down run steam, is admitted at 102. For the uprun steam is admitted at 103. For the up air blast, air is admitted at 104. These connections are supplied with valves so that air and steam can be admitted in alternation. 105 indicates the outlet for down run blue water gas.

In one form the cylinder $g^1$ of the revolving grate is attached to or forms part of an annular pan or trough $h^1$ containing water in which a cylindrical apron $l$ depending from the annular vessel $a$ is sealed outside the circle of the grate cylinder $g^1$, and an extension or outwardly and downwardly extending lip $m$ of the central conduit is sealed within the circle of the grate cylinder $g^1$. The pan or trough $h^1$ is shown provided with a worm wheel 1 which is engaged by a worm 2 driven through gearing 3 from an electric motor 4, but other driving mechanism may be used. The clinker and ash are continuously pushed under the outer sealed apron $l$ by the eccentric motion of the grate cylinder and are brought to the surface of the water and deposited where required by means described later herein, the speed at which the power driven grate cylinder revolves being regulated as required to extract and discharge the clinker and ash as may be desired from time to time.

To protect the critical portion of the inner wall of the annular vessel $a$ from the wear due to the constant crushing of the clinker, the lower part of the plate forming the inner wall of said vessel is joggled as shown and a renewable wearing strip $a^2$ is inset into this portion of the boiler so that it does not form a ledge or lodging place from which the clinker can build out into the cross section of the fuel or arch over the grate.

A scraper $n$ fastened to the fixed central conduit $k$ or to the rotating grate sweeps into the central conduit, from which they can be easily removed, ashes that may work through the air spaces in the grate.

Where double water seals are adopted to provide for the rotation of the grate and the continuous expulsion of the clinker as described with reference to the apron $l$ and lip $m$, these seals are connected by a passage $o$ at or near the bottom and a visible supply of water for the maintenance of both seals is introduced through a pipe $p$ to the hidden inner seal whence it flows to the outer seal as required to maintain the right quantity of water in the seals. The less accessible inner seal is deeper than the outer seal and the inner wall $h^3$ of the annular pan or trough is higher than its outer wall so that only the outer seal need be supervised. Owing to the eccentricity of the grate and its supporting cylinder, the obvious simple method of construction would result in the outer leg of the inner seal being much larger in capacity than the inner leg, so that, to prevent overflowing of the inner leg of the inner seal when an increase of pressure takes place in the generator water would have to flow through the passage $o$ from the inner to the outer seal more quickly than is practicable. This trouble is overcome by providing the eccentrically rotating cylinder $g^1$ with the lining $g^2$ to sufficiently equalize the capacities of the two legs.

In order that the effective depth of the water seal may be indicated continuously throughout the working of the plant, two gauges indicated at $q$ and $r$ (preferably located side by side on the operating floor) are adapted to respond respectively to the level of the exposed or uncovered portion of the water seal and to the pressure on the enclosed or covered portion of the water seal. The gauge $q$ indicating the water level may conveniently be made to respond to the level of the seal by an air pipe $q^1$ dipping into the water seal below the range of its working level with its other end connected to the gauge $q$, air under pressure (say from the generator blast supply) being allowed to pass slowly into the pipe $q^1$ and escape at its open end through the water seal; as the head of water above the open end of the pipe varies the pressure in the air pipe will vary correspondingly and the gauge $q$, thus caused to indicate the water level. The gauge $r$ is connected by the pipe $r^1$ to the central conduit $k$ so that it is subject to the pressure in the generator. The difference in the levels shown by the two gauges $q$ and $r$ will represent the height of water inside the sealing apron $l$ above its lower edge and the general water levels indicated will show the operator whether or not the water in the seal is sufficient to afford the maximum depth of seal.

Beneath the several rollers $i$, which preferably are employed to support the ashpan grate and fuel bed, are provided supports in the form of studs $s$ of which only one is shown in Figure 1 and which are adjustable so as to leave a determined clearance between each support and its roller and are adapted, should the roller journals or bearings give way, to uphold the rollers in approximately their normal positions and thus prevent the plant being damaged or stopped, the grate instead of turning the rollers sliding over them, until such time as repairs can be conveniently effected.

To maintain the speed of extraction of the clinker and ash will keep the fuel bed in the most efficient condition while safeguarding all parts of the grate from damage due to excessive heat, the speed of rotation of the grate (which determines the speed at which the clinker and ash are expelled and the hot fire descends) is regulated, either automatically or by hand, in accordance with the temperature indicated, say during the down run, by a pyrometer suitably located beneath the grate for instance in the conduit $k$ at $x$, or the pyrometer or an electric device similarly situated may be adapted automatically to stop the grate if the too rapid discharge of the clinker and ash raises the temperature of the grate beyond the desired limit.

The speed regulation of the revolving grate and bottom to suit the requirements of various fuels and working conditions of the generator is obtained by means of any suitable variable speed mechanism; for example, a variable speed motor, or a set of change gears, or a rocking ratchet or free wheel grip motion (the throw of the rocker movement being regulated by means of an adjustable crank pin or an adjustable eccentric), or a combination of two or more such mechanisms may be employed.

Figure 3:
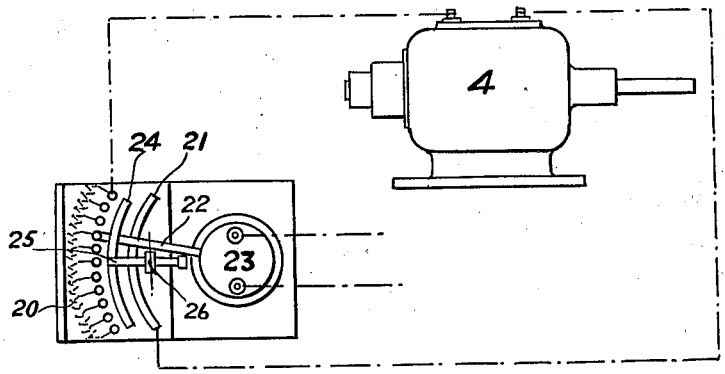
Figure 4:
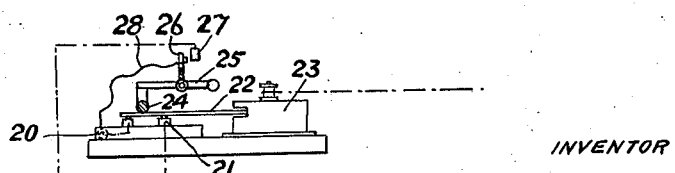

Figs. 3 and 4 illustrate diagrammatically by way of example one arrangement for automatically regulating the speed of rotation of the grate in accordance with the temperature beneath the grate. In this case the circuit of the shunt coils of the motor 4 includes a variable resistance 20, a conducting bridge 21 and the arm or needle 22 of a galvanometer 23 which is included in the circuit of a thermo-couple or pyrometer at $x$ (Fig. 1). The arm or needle 22 is normally held down on the resistance 20 and bridge 21 by a bar 24 carried by a lever 25 but to allow the arm or needle 22 to take up the position corresponding to the temperature to which the thermo-couple or pyrometer is subject, the lever 25 is periodically rocked by means actuated by the motor 4 or the grate itself through suitable gearing and the arm or needle 22 thus released. As this would result in the circuit of the shunt coils being broken, a finger 26 carried by but insulated from the lever 25 is adapted to complete the circuit through a contact 27, which is in electric connection with the bridge 21 and a lead 28 taken off the resistance 20 at or near its middle so that for the short period of release of the arm or needle 22 the motor assumes an average speed. On the arm or needle 22 being again pressed down by the bar 24 the finger 26 will leave the contact 27 and the shunt circuit again be completed through a part of the resistance determined by the temperature of the thermo-couple or pyrometer and the consequent position of the arm or needle 22, the motor assuming a speed in accordance with the amount of the resistance thus put in or out of the shunt circuit.

The arm or needle 22 may be arranged to complete the circuit of a magnetic switch when the temperature becomes excessive, the switch then shutting down the motor and stopping the grate.

Means for reversing temporarily the rotation of the grate is provided either by a reversible motor drive or by a hand crank suitably applied to the driving gear, the motor being uncoupled if desired to facilitate this.

To effect the automatic discharge of the clinker and ash through a water seal of the depth required for a generator working at the pressures required for efficient water-gas production, the outer wall $h^1$ of the annular pan or trough is provided on the inside with shallow ribs $h^2$ which propel the clinker and ash up the ascending incline of a suitably shaped fixed plough $t$ to the desired place of discharge, the ribs being inclined in the reverse direction to the plough so that they tend to lift the clinker and ash.

As will be understood it is not essential that all the features herein described should be embodied in a self-clinkering and self-steaming generator though in most cases it will be found advantageous.

In another form the revolving grate is enclosed in a gas-tight casing and the clinker and ash are directed by guide plates or the like into one or more pockets from which they are from time to time emptied through doors at the bottom.

Figure 2:
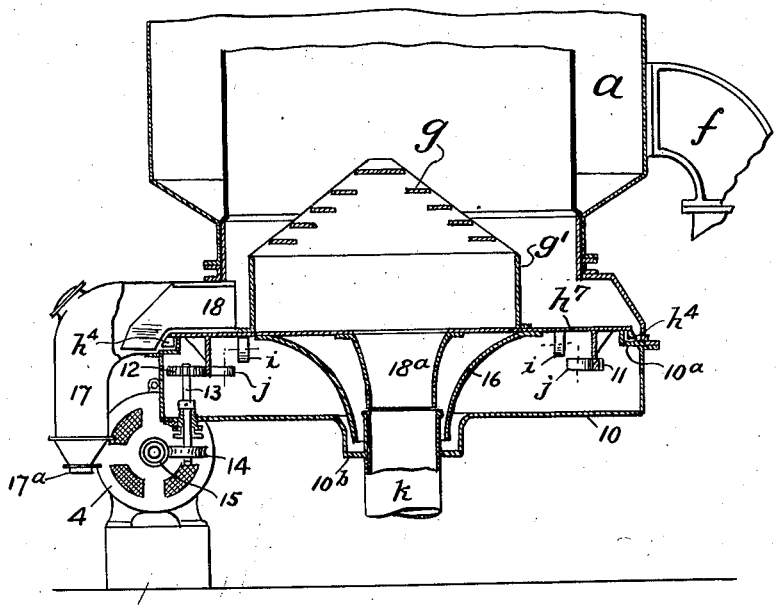
Fig. 2 is a view similar to Fig. 1 showing the lower part of a modified form of water gas generator.

In a construction of this nature as illustrated by Fig. 2 of the drawings, the gas-tight casing 10 extends from the central conduit $k$ to the bottom of the wall of the generator; the grate cylinder $g^1$ is carried by a circular bottom plate $h^7$ supported by rollers $i$ and maintained in position by rollers $j$ that bear against an annular depending rib 11; the rollers $i$ and $j$ are supported in suitable manner from some fixed part such as the casing 10. The rib 11 is formed externally with teeth engaged by a spur wheel 12 fixed upon a spindle 13 having a worm wheel 14 in gear with a worm 15 on the shaft of a motor 4. The casing 10 is formed with an internal trough $10^a$ which prevents the ashes from falling down into the space below and the overlapping edge of the plate $h$ is formed with a number of inclined projections $h^4$ which tend to prevent the ashes from packing or accumulating in the trough $10^a$ and passing over the edge. To prevent the passage of air or gas through the casing 10 and around the edge of the plate $h^7$, the latter may also be provided with a depending annular plate 16 the lower edge of which extends into a depression $10^b$ formed in the casing around the central conduit $k$, which depression contains sand or other sealing material. 17 is a pocket connected at its upper part to the space around the eccentric cylinder $g^1$ by a horizontal branch fitted with or formed as inclined scraper 18 extending some distance over the plate $h^7$, rotation of the plate $h$ and grate cylinder $g^1$ causing the ash and clinker to be scraped into the pocket 17. The bottom of the pocket is funnel-shaped and fitted with a door $17^a$.

The plate $h^7$ is formed with central opening for the passage of air, steam and gas and a short tube $18^a$ may be fixed to the plate $h^7$ around this opening and extend towards the conduit $k$.

The boiler of the generator is connected with a waste heat boiler or other steam supply, not shown, so that should there be a deficiency in the steam supply from the boiler of the generator for gas making purposes, such deficiency will be automatically supplied by the waste heat boiler or other supply.

The water gas generator is operated in accordance with the customary gas practice now standard, which consists in introducing a blast of air through pipe 104 which passes upward through the fuel bed and escapes through the stack opening in the center of the top thereof. The stack opening is then closed and steam may then be admitted through the pipe 103 and allowed to pass up through the incandescent fuel bed to form blue water gas which escapes through the opening 30 near the top of the generator. Steam may then be introduced to the top of the generator through the inlet 102 and down run water gas generated which passes out through outlet 105. An air blast may then be made as previously described and this cycle continued or varied in any desired combination to meet the requirements of the particular plant and the local conditions of the gas system which the generator serves.

By the means above described, I attain a safe self-clinkering, self-steaming, and self-contained boiler or steam generator for water gas production, wherein the temperature of the top of the fuel bed is properly maintained, without waste of either hot water or steam, from which the ash and clinker (with a minimum of unconsumed carbon) issue automatically and continuously at the bottom, and wherein the boiler is necessarily exposed to merely nominal pressure, inasmuch as the generator itself consumes all of the steam produced. The top of the heated annular water-leg must be above the clinker adhesion zone for fire-brick (with suitable margin for variations in fuel and operating conditions), and, if desired, it may be extended sufficiently high to provide substantial correspondence between the production of steam and the production of gas, practical regulations being attained by adjusting the rates of air blowing and steaming and the length and division of the operating cycle, which, however, involves considerable variation in make of gas. To maintain exact correspondence between the supply of steam to the generator and the most efficient generation of water gas, and because it is generally desirable (other things being equal) to limit the absorption of generator heat for steam production to what would otherwise be wasted, for example, to radiation, it is more advantageous to connect the high pressure steam service actuating the machinery (preferably supplied from water-heat boilers utilizing the escaping blast gases) with the low pressure generator service, through a restricted conduit controlled by a regulated reducing valve, the low pressure service being equipped with a regulated escape valve. Where two or more generators are in use, their low pressure steam services may be advantageously connected to minimize the variation in pressure between the steam "run" and the air "blow;" but this variation is not wholly objectionable, inasmuch as the steam pressure falls and automatically reduces the rate of steam supply as the temperature and consequently the gas-making capacity of the fuel bed decreases. Moreover, the boiler is so proportioned that the evolution of steam from the large content of water heated to the equivalent of the maximum pressure is automatically increased as the pressure and consequently the steaming temperature falls—thus sufficiently compensating for the generator's intermitting demand for steam. While, for purposes of safety and economy, I prefer to use the steam from the boiler or steam generator exclusively for its own low pressure generator service, it is obvious that the boiler, if sufficiently strong, may be utilized for high-pressure steam production.

Having now particularly described and ascertained the nature of my said invention and in what manner the same is to be performed I declare that what I claim is:—

1. A water gas generator having a fuel chamber of which the inner wall presents a continuous surface and comprises a metal part and a superposed part of refractory material, means for cooling said metal part, a mechanical grate structure comprising an imperforate bottom and an upper portion extending above the bottom of the cooled metal part of the wall and having passages through it arranged above the bottom of the cooled metal part, means connected with the interior of the upper part of the grate for conveying down run gas and up run steam, and means for admitting down run steam and for taking off up run water gas and air blast gas.

2. A water gas generator including a fuel chamber having an inner wall consisting of a metal part and a superposed part of refractory material, means for cooling said metal part of the wall, means for admitting down run steam, a mechanical disintegrating and expelling grate having an upper part provided with perforations disposed above the lower edge of said metal part, and means connecting with the interior of the perforated upper part of the mechanical grate for introducing air and withdrawing down run gas substantially exclusively through the upper part of the grate.

3. A water gas generator having a fuel chamber, means for up air blasting and up steam blasting and for admitting down run steam and for taking off down run water gas, means for absorbing heat arranged at and confined to the lower part of the fuel chamber and means for retaining heat arranged at and confined to the upper part of the fuel chamber consisting respectively of a water vessel and a fire-brick wall, and a clinker disintegrating mechanical grate having passages confronting the water vessel.

4. A water gas generator having a fuel chamber the inner wall of which comprises an upper portion of refractory material superimposed on a lower portion of metal, means for admitting down run steam and taking off uprun water gas and air blast gases in the upper portion of the chamber, a mechanical ash and clinker expelling grate having ports for the passage of down run water gas and air and steam, means for admitting air and steam to the grate, and means for withdrawing down run water gas, said grate and said metal wall being so arranged that the wall extends downward at least to the level of the lowest ports of the grate.

ARTHUR G. GLASGOW.